United States Patent
Uhlendorf et al.

(10) Patent No.: US 11,402,139 B2
(45) Date of Patent: Aug. 2, 2022

(54) CONTROLLER FOR A COOLING UNIT COMPRESSOR, SYSTEM AND USE

(71) Applicant: Eppendorf AG, Hamburg (DE)

(72) Inventors: Rüdiger Uhlendorf, Dransfeld (DE); Gary Poole, Maldon (GB); George Mason, Maldon (GB); Ted Kao, Penang TG (MY)

(73) Assignee: EPPENDORF AG, Hamburg (DE)

( * ) Notice: Subject to any disclaimer, the term of this patent is extended or adjusted under 35 U.S.C. 154(b) by 820 days.

(21) Appl. No.: 16/318,761

(22) PCT Filed: Jul. 18, 2017

(86) PCT No.: PCT/EP2017/068152
§ 371 (c)(1),
(2) Date: Jan. 18, 2019

(87) PCT Pub. No.: WO2018/015398
PCT Pub. Date: Jan. 25, 2018

(65) Prior Publication Data
US 2019/0234663 A1  Aug. 1, 2019

(30) Foreign Application Priority Data

Jul. 20, 2016 (EP) .................................. 16180375

(51) Int. Cl.
*H02P 21/14* (2016.01)
*H02P 3/24* (2006.01)
(Continued)

(52) U.S. Cl.
CPC .............. *F25B 49/022* (2013.01); *F25B 7/00* (2013.01); *F25B 49/025* (2013.01); *H02M 5/44* (2013.01);
(Continued)

(58) Field of Classification Search
CPC ................................... H02P 5/74; H02P 27/06
See application file for complete search history.

(56) References Cited

U.S. PATENT DOCUMENTS

| | | | |
|---|---|---|---|
| 8,011,191 B2 | 9/2011 | Wang et al. | |
| 2010/0052599 A1* | 3/2010 | Nagai | H02P 21/28 318/766 |

(Continued)

FOREIGN PATENT DOCUMENTS

| | | |
|---|---|---|
| JP | 2002112588 A | 4/2002 |
| JP | 2009136052 A | 6/2009 |

(Continued)

OTHER PUBLICATIONS

International search report for patent application No. PCT/EP2017/068152 dated Oct. 11, 2017.

*Primary Examiner* — Muhammad S Islam
*Assistant Examiner* — Charles S Laughlin
(74) *Attorney, Agent, or Firm* — Bachman & LaPointe, P.C.

(57) ABSTRACT

The invention relates to a control apparatus for a refrigerator compressor having at least one two-phase AC asynchronous motor (K1, K2), having mains connection means (10) for connection to a preferably public voltage supply network which nominally provides a mains AC voltage of between 85 V and 264 V, in particular between 100 V and 230 V, first voltage converter means (14) which are connected downstream of the mains connection means and are intended to generate an intermediate voltage, in particular an intermediate DC voltage, from the mains AC voltage, second voltage converter means (16-1, 16-2) which are connected downstream of the first voltage converter means and are intended to generate an output signal which is independent of a level and a mains frequency of the mains AC voltage, in particular has a constant voltage and/or frequency in (Continued)

periods, and is intended to control the refrigerator compressor with an AC voltage of a plurality of differently predefinable voltage levels, wherein the mains connection means are assigned voltage detector means (12) for capturing the mains AC voltage, the detector output signal from which can be evaluated by the second voltage converter means or control means (24) assigned to the latter for the purpose of generating a mains-voltage-dependent maximum value for a current of the output signal.

17 Claims, 1 Drawing Sheet

(51) Int. Cl.

| | | |
|---|---|---|
| H02M 7/04 | (2006.01) | |
| F25B 49/02 | (2006.01) | |
| F25B 7/00 | (2006.01) | |
| H02P 27/04 | (2016.01) | |
| H02P 1/42 | (2006.01) | |
| H02P 1/44 | (2006.01) | |
| H02M 5/458 | (2006.01) | |
| H02M 5/44 | (2006.01) | |

(52) U.S. Cl.
CPC ............ *H02M 5/458* (2013.01); *H02P 1/426* (2013.01); *H02P 1/44* (2013.01); *H02P 27/047* (2013.01); *F25B 2700/2104* (2013.01)

(56) References Cited

U.S. PATENT DOCUMENTS

| | | | |
|---|---|---|---|
| 2010/0072216 A1* | 3/2010 | Voute | A01N 1/0263 |
| | | | 220/737 |
| 2012/0187764 A1 | 7/2012 | Rockenfeller et al. | |
| 2012/0260687 A1* | 10/2012 | Inaniwa | B04B 9/10 |
| | | | 62/196.1 |
| 2016/0215771 A1* | 7/2016 | Hu | F25B 1/02 |

FOREIGN PATENT DOCUMENTS

| | | |
|---|---|---|
| JP | 2013506814 A | 2/2013 |
| WO | 03044939 A1 | 5/2003 |
| WO | 2011041374 A2 | 4/2011 |

* cited by examiner

CONTROLLER FOR A COOLING UNIT COMPRESSOR, SYSTEM AND USE

BACKGROUND OF THE INVENTION

The present invention relates to a controller for a cooling unit compressor having at least one two-phase AC asynchronous motor. Furthermore, the present invention relates to a system comprising such a controller in connection with a cooling unit compressor having two AC asynchronous motors, and the present invention relates to a use of both such a controller and such a system to realize a cooling unit in deep cooling temperature ranges.

Generic controllers and cooling unit compressors of cooling units controlled by them relate in particular to the field of what is known as ultra-low temperature (Ult) freezers, cooling units of this kind, which are commonly used for industrial and research purposes, are capable of keeping a used cooling space at a cooling temperature below −40° C., typically even below −60° C. to up to −80° C. and below. A typical intended use of these devices is long-term cooling; that is, biological or medical samples or ingredients of this kind that can be suitably used as goods to be cooled are commonly stored at these target temperatures for several weeks or even months, so generic cooling technology is configured for a permanent cooling mode using corresponding cooling units, which themselves commonly have an electrical power consumption of typically about 1.2 kW (in a stationary state at a cooling temperature below −50° C.). Accordingly, the electrical energy consumption of this technology in the range of about 15 kW to 20 kW per day is high.

It is to be presumed to be known from the state of the art that the desired low target temperatures will be provided not only by means of a single coolant branch, which usually has an AC asynchronous motor as a compressor motor, within the framework of the compressor unit; instead, it is known for a two-stage system to be provided, which will correspondingly have two compressor motors. In this regard, U.S. Pat. No. 8,011,191 B2, for example, which is to be referred to regarding the general technological background of the present invention, discloses a cascade system composed of two coolant circuits having respective compressor motors in the field of ultra-low temperature cooling units below −40° C., a first coolant circuit interacting with the operating environment via a steam condenser, while a cooling volume generated by the first cooling circuit will be cooled down further by a second cooling circuit so as to reliably achieve the desired values of up to −80° C. and below. From this state alone, it is known for the AC asynchronous motors serving as compressor motors to be suitably switched on and off by thermostat or sensor control so as to ensure that the target temperature is maintained as a permanent operating temperature after down-cooling.

U.S. Pat. No. 8,011,191 B2 already addresses disadvantages of said state of the art and criticizes a lack of efficiency in terms of energy consumption of a system of this kind; for instance, the cooling circuits and thus the respective operating lines of the motors are configured for maximum load, which, while advantageous during down-cooling, will no longer be needed during the stationary cooling mode at the target temperature. The cited state of the art criticizes in particular the fact that switching the motors on and off raises mechanical issues in addition to the disadvantages in efficiency and promotes vibration and noise generation.

U.S. Pat. No. 8,011,191 B2 takes the approach of solving this problem by variable-speed control of the compressor motors and envisages in particular that in order to reduce load once the target temperature has been reached after down-cooling, for example, and once the temperature has to be (merely) maintained at that level, the motor speed will be suitably lowered for said purpose.

While this solution seems elegant in principle and allows variability of the compressor motor output(s), this known approach is still not without disadvantages: for instance, the complexity of control and of the motor structure is significantly increased, wherein it has to be taken into account that the electrical rated outputs are in the kilowatt range, meaning that a significantly higher complexity in terms of controlling in connection with a corresponding motor design is required. Moreover, in the sensitive technical field of ultra-low temperature cooling units, each additional required compressor feed line, such as a through-line of a cable for a speed sensor or the like, leads to issues regarding sealing and heat bridges and thus is disadvantageous on principle.

In the state of the art according to U.S. Pat. No. 8,011,191 B2, there is the additional problem that there, too, adaptation of the motor control to different mains voltage systems or predefined mains voltages of a particular supply network is possible only with significantly increased complexity of circuitry. This is because in the rest of the state of the art it is otherwise known to use suitable compressor motors according to respective regions (North America, Japan, Europe, etc.) and the region's AC voltage network and to configure them for the mains voltage at hand (including the particular frequency, which is typically 50 Hz or 60 Hz). When the motors are simply switched on/off, this will lead to trouble-free operation on such a mains, but a specifically adjusted asynchronous motor will of course be required with regard to universal usability of a motor control for different AC voltages and AC voltage mains. In this context, too, there is obvious need for improvement, not least as there is the need to be able to flexibly operate a cooling unit of the generic kind at hand at different mains voltages and mains frequencies, typically in the range between 100 V and 230 V, 50 Hz to 60 Hz, without having to make fundamental modifications.

Finally, the respective mains voltage environments from (commonly public) supply networks offer another challenge, which affects the dimensions and the design of cooling unit compressors including their associated control: commonly, according to a particular network specification of a territory or country, a maximum current that can be drawn from said AC voltage supply network must not be exceeded. While consumption points for higher currents may of course be established for special applications, they cause disproportionate costs on top of the additional work. The device according to U.S. Pat. No. 8,011,191 B2 does not appear to have been optimized in terms of (maximum) current consumption in this regard.

SUMMARY OF THE INVENTION

Therefore, the object of the present invention is to provide a controller for a cooling unit compressor having at least one two-phase AC asynchronous motor whose (hardware-related) technical realization is simple, which in particular does not rely on complex control electronics for speed variation of the compressor motor while being capable of ensuring energy efficiency by lowering of the electrical power consumption in particular during a stationary cooling mode after down-cooling and which simultaneously makes sure that limits immanent to the supply network in terms of a maximum current to be consumed will not be exceeded in any operating state.

The object is attained by the controller having the features of the main claim; advantageous embodiments of the invention are described in the dependent claims. Additional protection within the scope of the present invention is claimed for a system having such a controller according to the invention that has (at least) two AC asynchronous motors for realizing the cooling unit compressor as a cascaded staged unit, such as the one described by way of example in U.S. Pat. No. 8,011,191 B2, for example, whose cooling circuit structure and compressor structure is to be considered incorporated in the present disclosure as part of the invention. Finally, the present invention claims a use of such a controller according to the invention or a use of such a system, which is to realize a cooling unit having a target cooling temperature of <−40° C., preferably <−60° C., more preferably <−75° C.

In a manner advantageous according to the invention, the present invention takes a different approach than the state of the art cited above: this is because it has been found according to the invention that a system composed of first and second voltage converter means may allow not only flexible adaptation to different input (mains) voltages having different mains frequencies as predefined by a respective supply network, but also permits an architecture of this kind at the output side, i.e. allows compressor motors to be connected that are configured as AC asynchronous motors to be provided with an AC voltage output signal which can be predetermined and set to different voltage levels; this is based on the finding that in a maximum-power down-cooling mode, for example, a higher AC voltage is applied than during a later stationary cooling mode that relates to keeping the target temperature constant, the voltage converter means thus laying the technical groundwork for that.

Also according to the invention, voltage detector means for detecting the AC mains voltage are provided, their detector output signal being used by the voltage converter means to determine and impress a maximum current value for the output signal according to the capacity of the particular supply network.

Thus, the preset invention achieves optimized operating behavior at prime energy efficiency without the need for speed variation or speed control of the at least one AC asynchronous motor and without the risk of excess power draw being incompatible with the conditions of the particular supply network (which can be connected flexibly and variably).

In a manner advantageous according to the invention, the voltage converter means thus ensure with the aid of the temperature sensor means assignable to the used cooling space of the cooling unit and by action of associated operating mode means that in response to a temperature detected by the temperature sensor means being above a threshold, i.e. above a target cooling temperature of the used cooling space, the operating mode means cause the second voltage converter means for generating the output signal to operate on a first output AC voltage level, which can preferably be constant (during said control phase) and also allows the connected (at least one) motor to draw power up to the maximum current value. In response to a detected temperature reaching or dropping below the threshold, on the other hand, the voltage converter means for generating the output signal are caused to operate on a lower second output AC voltage level by action of the operating mode means. This is based on the finding that a reduced motor output (at constant motor speed, insofar correspondingly at constant pumping volume) thus achieved is sufficient in order to significantly reduce energy consumption of the motor(s), such as for the purpose of keeping the target temperature constant once down-cooling is complete. In the case of a typical first output AC voltage level of 230 V, for example, said lower second output AC voltage level can drop to 150 V or even lower, which is why, in an advantageous embodiment according to the invention, a ratio of said lower second output AC voltage level is typically <0.8 and in the preferred range between 0.6 and 0.75 with respect to the first output AC voltage level (in terms of the effective values).

In the course of the temperature reduction of the used cooling space made possible by the advantageous temperature sensor means, the other preferred embodiment of the invention is that when two asynchronous motors used in the manner of a cascade with cooling circuits assigned to each are employed as the respective compressor motors, said cooling circuits are activated separately and independent of temperature by means of the assigned motors. In an advantageous embodiment, this happens in that only the first AC asynchronous motor is provided with AC output signals in a cooling mode until the temperature reaches or drops below a first upper temperature threshold (typically about −40° C. with a lower target and operating temperature value being −80° C., for example), while the second AC asynchronous motor for the second cooling circuit, which is cascaded and thus configured analogously to the discussed state of the art, is controlled once the temperature has reached or dropped below said threshold.

According to another preferred embodiment of the invention, the voltage detector means assigned to the mains connection means allow the second voltage converter means to be configured in such a manner that they interrupt control and supply of the connected motor(s) when the detected mains voltage potential suggests that once the current reaches or exceeds the maximum current value, the device will operate outside of an intended or permissible operating range. Thus, the controller according to this embodiment ensures that the output signal is interrupted in such a case, i.e. that the motor(s) is/are no longer supplied with the signal.

As a result, the invention allows in a surprisingly elegant and simple fashion for at least one single-phase bipolar AC asynchronous motor (with an additional auxiliary phase, such as realized by a capacitor or electronically) to be controlled as a two-terminal device and by means of a two-wire connection (or three-wire if an auxiliary phase is electronically generated) without any complex speed control being performed and without speed detection or sensor signals of the like being processed for this purpose and without any additional complex current measurement or current detection at the output side of the controller regarding the load (motor). In the present invention, this is elegantly achieved by means of the voltage detector means according to the invention at the mains inlet.

Thus, it is to be expected that cooling unit compressor systems realized according to the invention will find wide use, not least because of their universal connectibility to a multitude of mains voltage environments and their significantly reduced electrical energy consumption, meaning that while a use in connection with a cooling unit for ultra-low temperatures in the fields discussed above is preferred, it does not limit the scope of application of the present invention.

For instance, in the low-temperature context described above, the present invention allows the typical power draw of a two-stage cooling device at cooling temperatures below −50° C. to be lowered from about 1.2 kW to 0.8 kW or less.

Over a longer period of time, which in particular also includes different operating phases, energy conservation of at least 15% should typically be achievable.

BRIEF DESCRIPTION OF THE DRAWINGS

Other advantages, features and details of the invention are apparent from the following description of preferred embodiments and from the figures.

DETAILED DESCRIPTION

Figure 1:
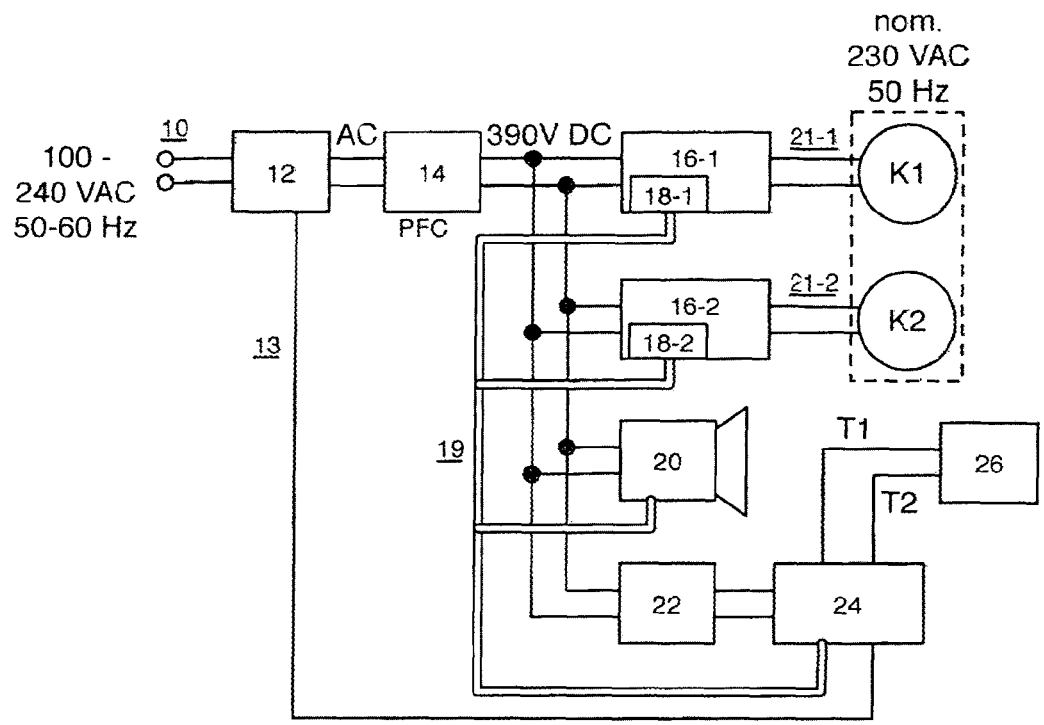
FIG. 1 depicts a block diagram of the controller according to the invention for a cooling unit compressor having two controlled AC asynchronous motors according to a first preferred embodiment of the invention.

The schematic block diagram of FIG. 1 shows the substantial functional components for realizing the controller as per the invention according to the first preferred embodiment. Two AC asynchronous motors K1, K2, each configured for an AC voltage of 230 V at 50 Hz, can be controlled. In a manner otherwise known, such as from U.S. Pat. No. 8,011,191 B2, the cooling circuits each assigned to motors K1, K2 are connected to each other and cascaded in such a manner that a first cooling circuit, which is assigned to compressor motor K1, interacts with the surroundings of the device, which is embedded in a common housing or cabinet of an ultra-low temperature (ULT) cooling unit (not shown), while a second cooling circuit, which is coupled to said first cooling circuit by means of a heat exchanger (not shown), cools a cooling temperature which has been generated at the heat exchanger by the first cooling circuit further down to a target or useful cooling temperature of a cooling space (not shown) by action of compressor motor K2.

The shown system composed of two compressor motors K1, K2 can be operated by connection to (public) supply networks in a wide input voltage range between 100 V and 240 V AC voltage, i.e. voltages typically available at mains connection means 10, such as common mains sockets not specifically configured for maximum current operation. The embodiment shown is configured in such a manner that it does not exceed any maximum limits, which will be explained below, according to a maximum current draw from the supply network as prescribed for a region; for example, the maximum limits are 13 A for a 230 V/50 Hz supply network in Great Britain, as opposed to 15 A in a Japanese 100 V/50 Hz supply network, without the necessity of raising these current thresholds in a complex and costly manner through additional supply measures in either case.

In the embodiment shown in FIG. 1, a power detection unit 12, which in particular also has a voltage detector function for an AC voltage present at mains connection 10, is connected downstream of the mains connection means at the input side. A detector output signal of said detector means 12 is connected to a mode and control unit 24, which will be explained in detail below, via a control line 13.

The AC voltage input signal provided by the public supply network is converted into the respective output signals for controlling asynchronous motors K1, K2 by means of a two-stage converter or inverter unit, namely first by means of a first converter stage 14, which converts the applied AC voltage input signal into a 390 V DC voltage in an otherwise known manner, while being additionally provided with a power factor correction (PFC), which is configured as an active power factor correction in the case at hand, namely largely adjusting the curve of the drawn current to the (sinusoidal) mains voltage by means of a large capacitor in an otherwise known manner (and not shown in detail in the circuit diagram).

In the schematic block diagram of FIG. 1, said first stage 14 having the step-up converter is followed by a pair of second converter modules 16-1, 16-2, which are assigned to and connected upstream of asynchronous motors K1 and K2, respectively. Said second converter stages convert the 390 V DC voltage signal into an AC voltage as control voltage for the asynchronous motors, which, in the illustrated embodiment, is applied to two-wire output lines 21-1, 21-2, the respective auxiliary phases of asynchronous motors K1, K2 then being generated by capacitors (not shown in detail) provided therein.

The level of the AC voltage at the output side as the respective motor supply voltage is determined by a control unit, which is schematically shown by reference sign 18-1 (for converter module 16-1) and 18-2 (for converter module 16-2) and which receives a voltage control signal corresponding to the AC voltage to be generated and applied for the respective asynchronous motor K1, K2 from mode control unit 24 via a bus line 19. Modules 16, 18 consist of power semiconductor pairs (HS, LS) switched in an otherwise known manner by control unit 18, such as according to a half-bridge topology, and thus realize a switching power supply function using a control signal-dependent AC output voltage.

The level of said control voltage applied or to be applied to K1, K2 as the output signal of the two-stage converter device is determined by mode and control unit 24, which is dependent in particular on temperature input signals T1, T2 of a temperature sensor unit 26. In the embodiment at hand, temperature value T1 is a temperature signal which corresponds to a heat exchanger temperature or to a connection and transition temperature between the cooling circuits assigned to the motors. This advantageously ensures that only first compressor motor K1 is activated in the first place during down-cooling until a temperature threshold is reached at, for example, the mentioned heat exchanger. Once the temperature reaches or drops below said threshold, which typically correspond to about −40° C. in the case of a unit configured for a target temperature of −80° C. of the overall system, second compressor motor K2 is (additionally) activated and will continue to lower the temperature using the associated cooling circuit. In the embodiment shown, temperature signal T2, outputted by temperature sensor unit 26, describes the temperature of the used cooling space, i.e. of the chamber or zone of the cooling unit in which the goods to be cooled are going to be stored at the target temperature (here about −80° C.). On the basis of temperature signal T2, and in particular upon arrival at said target temperature, the motor supply voltage will be changed in a manner described below by appropriately controlling the second inverter stages 16-1, 16-2, namely in particular by lowering the (respective) motor supply voltage in order to conserve energy, while during regular operation, motor K1 and later also motor K2 are operated at nominal voltage (230 V) until the time of said arrival at the target temperature, namely during down-cooling.

Figure 2:
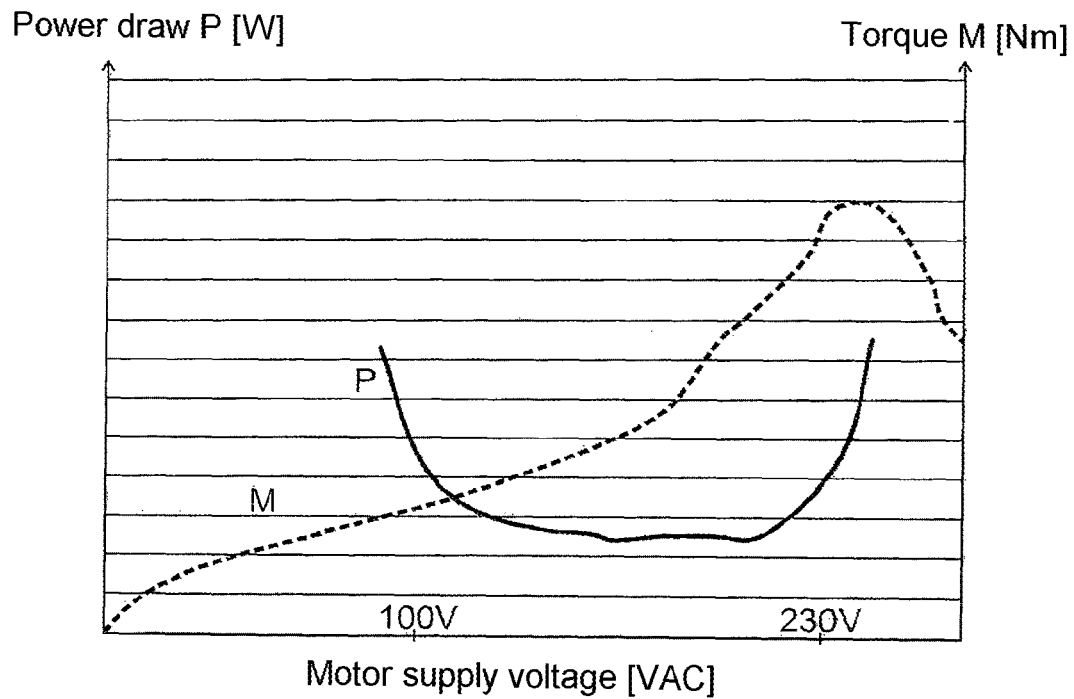
FIG. 2 depicts a diagram illustrating electrical power consumption and torque behavior of one of the asynchronous motors in the embodiment in relation to the supply voltage applied.

These correlations are clarified by the power and torque diagram of FIG. 2 as recorded for one of compressor motors K1, K2: advantageously according to the invention, it was found that the high motor torque, caused by an AC control voltage at or close to the nominal value of 230 V, is no longer needed when the target temperature is reached and to keep the target temperature constant. As the dashed torque curve of FIG. 2 shows to this effect that while a decreasing motor supply voltage at K1 and K2 is accompanied by a drop in the torque generated (the speed, however, staying the same; it remains unchanged throughout the control range and is not feedback-controlled, in particular), said lower torque is sufficient to ensure cooling behavior during the stationary or permanent cooling state according to the pressure conditions present in the cooling circuits. Hence, in the present invention, once the target temperature has been reached, the motor supply voltage is lowered, typically as far down as to 140 V to 150 V, which, according to the solid curve in the diagram illustration of FIG. 2, means a significant reduction of the electrical power draw of the respective motor. This is because it has proven advantageous within the scope of the invention to be able to achieve smooth and uninterrupted running of the compressor motors even with such low AC-voltage supply voltages while, in view of the lower torque required, the necessary pumping volume or pumping performance is still achieved at constant speed.

As additionally shown by the block diagram of FIG. 1, a voltage supply unit 22 as an additional converter unit generates a supply voltage for mode and control unit 24 from the 390 V DC voltage, and reference sign 20 additionally shows a schematic ventilator unit which can suitably additionally engage in the cooling mode according to an additional control option via bus 19.

The present invention is not limited to the embodiment shown or to the parameters cited therein. Both the temperature ranges and the voltage ranges are almost freely variable. Also, while the system composed of two cascaded cooling circuits each having an assigned asynchronous AC motor is advantageous, the invention is not limited to this configuration. Finally, the present invention is suitable for realizing a cooling unit for the ultra-low temperature range, typically <−50° C., more preferably <−70° C.; irrespective thereof, the controller according to the invention may also be used for other applications.

The invention claimed is:

1. A cooling unit compressor system, comprising a controller for a cooling unit compressor being driven by at least a first and a second two-phase AC asynchronous motor (K1, K2), the controller comprising:
   mains connection means (10) for connection to a voltage supply network nominally providing an AC mains voltage between 85 V and 264 V,
   first voltage converter means (14) connected downstream of the mains connection means and serving to generate an intermediate voltage from the AC mains voltage,
   second voltage converter means (16-1, 16-2) connected downstream of the first voltage converter means and serving to generate an output signal for the first and the second AC asynchronous motor, which is independent from a level and from a mains frequency of the AC mains voltage and which serves to control the cooling unit compressor with an AC voltage of a plurality of different predeterminable voltage levels,
   voltage detection means (12) assigned to the mains connection means, which serve to detect the AC mains voltage and whose detector output signal can be evaluated by the second voltage converter means or by controlling means (24) assigned to them in order to generate a maximum value dependent on the mains voltage for a current of the output signal,
   wherein the second voltage converter means for generating the output signal are configured in such a manner that in a cooling mode, the output signal is generated and outputted only for the first AC asynchronous motor until a temperature in a used cooling space reaches or drops below an upper first temperature threshold, and once the temperature reaches or drops below the upper first temperature threshold, the output signal for the second AC asynchronous motor is generated and outputted, and
   wherein temperature sensor means (26) and operating mode means (24) are assigned to the used cooling space and to the second voltage converter means in such a manner that in response to the temperature detected by the temperature sensor means being above a second temperature threshold, the operating mode means (24) cause the second voltage converter means for generating the output signal to operate on a first output AC voltage level with up to a maximum current that corresponds to the maximum current value, and in response to the temperature reaching or dropping below the second temperature threshold, the operating mode means cause the second voltage converter means for generating the output signal to operate on a second output AC voltage level, which is lower than the first output AC voltage level.

2. The system according to claim 1, wherein a ratio of the second output AC voltage level with respect to the first output AC voltage level is less than 0.8.

3. The system according to claim 1, wherein the second voltage converter means are configured in such a manner that a supply of the connected coolant compressor with the output signal is interrupted in response to the detector output signal of the voltage detector means if a value of the detector output signal which corresponds to a drawn current exceeds the maximum current value.

4. The system according to claim 1, wherein the first and second voltage converter means does not control the speed of a connected unit compressor and/or does not receive a signal which corresponds to or depends on a speed of the connected unit compressor.

5. The system according to claim 1, wherein the first voltage converter means realize a power factor correction (PFC).

6. The system according to claim 1, wherein at least one of the at least first and second AC asynchronous motors that is or can be connected to the second voltage converter means is or can be connected via two phases without any additional sensor lines and/or control lines and has means for generating an auxiliary phase.

7. A use of the system according to claim 1 for realizing a cooling unit that can be operated at a target cooling temperature of a used cooling space of the cooling unit of <−50° C.

8. The system according to claim 1, wherein the voltage supply is a public voltage supply.

9. The system according to claim 1, wherein the AC mains voltage is between 100 V and 230 V.

10. The system according to claim 1, wherein the intermediate voltage is an intermediate DC voltage.

11. The system according to claim 1, wherein the output signal is a temporary voltage-constant and/or frequency-constant output signal.

12. The system according to claim 1, wherein the first output AC voltage level and the second output AC voltage level are constant.

13. The system according to claim 2, wherein the ratio is in the range between 0.6 and 0.75.

14. The system according to claim 5, wherein the power factor correction is an active power factor correction.

15. The system according to claim 6, wherein the means for generating an auxiliary phase is a capacitor or electronic means for generating an auxiliary phase.

16. The use of the system according to claim 7, wherein the target cooling temperature is <−60° C.

17. The use of the system according to claim 7, wherein the target cooling temperature is <−75° C.

* * * * *